US012805443B2

(12) United States Patent
Créscio et al.

(10) Patent No.: US 12,805,443 B2
(45) Date of Patent: Nov. 24, 2026

(54) CONSTRUCTIVE ARRANGEMENT APPLIED TO HARVESTING MACHINE

(71) Applicant: Indústrias Colombo S.A., Pindorama (BR)

(72) Inventors: Alexandre Aparecido Créscio, Pindorama (BR); Fabio Massahide Santos Tanaka, Catanduva (BR); Oswaldo Argeu Leite, Catanduva (BR)

(73) Assignee: Indústrias Colombo S.A., Pindorama-SP (BR)

( * ) Notice: Subject to any disclaimer, the term of this patent is extended or adjusted under 35 U.S.C. 154(b) by 665 days.

(21) Appl. No.: 18/317,988

(22) Filed: May 16, 2023

(65) Prior Publication Data

US 2023/0371431 A1 Nov. 23, 2023

(30) Foreign Application Priority Data

May 18, 2022 (BR) ......................... 102022009636-8

(51) Int. Cl.

*A01D 34/28* (2006.01)
*A01D 34/04* (2006.01)
*A01D 57/03* (2006.01)

(52) U.S. Cl.

CPC ............. *A01D 57/03* (2013.01); *A01D 34/04* (2013.01); *A01D 34/283* (2013.01)

(58) Field of Classification Search

CPC ...... A01D 45/22; A01D 34/145; A01D 34/13; A01D 34/04; A01D 34/28; A01D 34/286; A01D 34/283; A01D 57/02; A01D 57/025; A01D 57/03

See application file for complete search history.

(56) References Cited

U.S. PATENT DOCUMENTS

| | | | | | |
|---|---|---|---|---|---|
| 3,813,859 | A * | 6/1974 | Fuller | A01D 34/14 | 56/158 |
| 4,660,360 | A * | 4/1987 | Hardesty | A01D 41/14 | 56/15.8 |
| 4,835,953 | A * | 6/1989 | Naaktgeboren | A01D 57/03 | 56/226 |
| 5,987,861 | A * | 11/1999 | Duncan | A01D 57/03 | 460/142 |
| 6,170,244 | B1 * | 1/2001 | Coers | A01D 57/03 | 460/142 |
| 6,442,918 | B1 * | 9/2002 | Fox | A01D 57/03 | 56/220 |
| 7,665,287 | B2 * | 2/2010 | Jones | A01D 57/02 | 56/226 |

(Continued)

FOREIGN PATENT DOCUMENTS

| | | |
|---|---|---|
| BR | 202012031697-3 | 9/2014 |
| BR | 102018015106-1 | 2/2020 |

(Continued)

*Primary Examiner* — Adam J Behrens

(74) *Attorney, Agent, or Firm* — B. Aaron Schulman, Esq.; Stites & Harbison, PLLC

(57) ABSTRACT

A constructive arrangement applied to harvesting machines, comprising a cam system that regulates attack angle of reel fingers, a cutting bar fixation using a top tether and roller sets which are attached to rear part of the bar that jointly sustain flexibility of the cutting bar, and a counterfoil shaped to allow base of a gearbox to take a higher position, without changing height of the cutting bar.

8 Claims, 9 Drawing Sheets

(56) References Cited

U.S. PATENT DOCUMENTS

| | | | | |
|---|---|---|---|---|
| 9,526,209 | B2 * | 12/2016 | Honey | A01D 57/12 |
| 9,844,183 | B2 * | 12/2017 | Honey | A01D 57/03 |
| 10,433,479 | B2 * | 10/2019 | Honey | F16H 37/124 |
| 2008/0022647 | A1 * | 1/2008 | Jones | A01D 57/03<br>56/220 |
| 2015/0272003 | A1 * | 10/2015 | Honey | A01D 57/03<br>56/181 |
| 2016/0183465 | A1 * | 6/2016 | Honey | A01D 61/002<br>56/226 |
| 2016/0255773 | A1 * | 9/2016 | Rayfield | A01D 57/03 |
| 2017/0055451 | A1 * | 3/2017 | Jasper | A01D 57/03 |
| 2018/0103580 | A1 * | 4/2018 | Neely | A01D 34/33 |
| 2020/0214208 | A1 * | 7/2020 | Shearer | A01D 57/02 |

FOREIGN PATENT DOCUMENTS

| | | | | |
|---|---|---|---|---|
| CA | 2876686 | C * | 1/2021 | A01D 57/03 |
| EP | 1048199 | A1 * | 11/2000 | A01D 57/03 |

* cited by examiner

CONSTRUCTIVE ARRANGEMENT APPLIED TO HARVESTING MACHINE

FIELD OF THE INVENTION

The claimed invention applies to the field of harvesting machines.

BACKGROUND OF THE INVENTION

Currently, the equipment used for cutting beans makes use of reels with cam systems to lift the raw plant from the soil and drag it to the platform, as shown e.g. by the patent document BR202012031697-3, disclosing a constructive arrangement for the cutting platform of a harvesting machine having a disc, attached to the bearings of the wheel, making a rotating movement, synchronized with the central axis of the reel, said disc being joined to a first set if concentric beamed shafts, to which free edge lengthwise bars are attached, provided with collecting arched fingers, also having, attached to said central axis, a second set of concentric beamed shafts, on which free edge said bars are borne; said first set of beamed shafts being connected to the disc by a rotating fixing and/or connection means with said bearing, regulated by an arm changing the angle between the disc and the central axis of the reel.

The development proposed by the above-mentioned document has a main deficiency, which is the fact that the angle of the reel finger over the conveyor belt, at the time of unloading, may not release the raw plant over the platform, which is then piled up over the reel, considering the continued rotation of said reel, causing loss and process interruption.

The patent document BR102018015106-1 is also known in the state of the art, disclosing a hard canvas platform with double command and flexible cutting bar, by means of arms formed by plates joined together by welded screws on the front part to the head of the body which is connected to the cutting system, having an elastic sheet, located on its central part, mechanically connected on the front part to the ears of the structure by a bolt and screw, retained on its rear part, also having a rubber socket joining said regulated body integrated to the structure, by means of holes allowing to change the position of said body.

The development disclosed by the above mentioned document presents, as its main deficiency, the fact that the arms sustaining the cutting system do not have a higher attachment point and, when in contact with soil depressions, eventually penetrates them, which may cause torsion or break the cutting bar, with consequent loss of time to repair the equipment; furthermore, since there is only rear hinge, the arm only moves itself in an angle, thus limiting the possibility of work on very irregular terrains.

It is also known that the cutting bar is activated by a gearbox transforming the rotation into linear movement, which is connected to the cutting bar by a connection known as “counterfoil”. However, due to the embodiment of the “counterfoils” as used for the current devices, the base of the gearbox is very close to the soil, smashing the beans under it and causing losses in the process.

Therefore, it is desirable to disclose means which may overcome the inconveniences found in the current techniques.

With the purpose to overcome all the inconveniences of the state of the art, the present constructive arrangement applied to a harvesting machine is disclosed, including the development of a cam system, which course has been changed so to regulate the attack angle of the fingers, when the raw plant is lifted from the soil, aiming to facilitate cutting, change the angle of the finger, when the cut raw plant is unloaded over the platform belts, thus avoiding the adherence and the return of the raw plant through the reel, reducing loss interruptions in the process.

The constructive arrangement applied to a harvesting machine as presented herewith also includes the development a cutting bar fixation using a top tether, formed by a steel cable, belt or chain, which, jointly with the roller sets which are attached to the rear part of said bar, sustain the flexibility of the cutting bar, so that, when the bar enters a depression on the soil, said top tether avoids the bar to be forced backwards, thus preventing its breaking or torsion, also providing further flexibility to the cutting bar, widening its freedom of movement against soil irregularities.

The constructive arrangement applied to a harvesting machine as disclosed herewith also includes the development of a “counterfoil”, which profile has been changed to allow the base of the gearbox to take a higher position, but not changing the height of the cutting bar, thus providing for a better and lower cut, not smashing the raw plants.

The constructive arrangement applied to a harvesting machine as disclosed herein provides the following advantages:

- better unloading of the raw plants over the conveyor belt;
- better lifting of the raw bean plants which are over the soil;
- prevention of raw plant smashing by the base of the gearbox;
- prevention of maintenance stops; and
- better reliability of the cutting system.

DETAILED DESCRIPTION OF THE INVENTION

Figure 1:
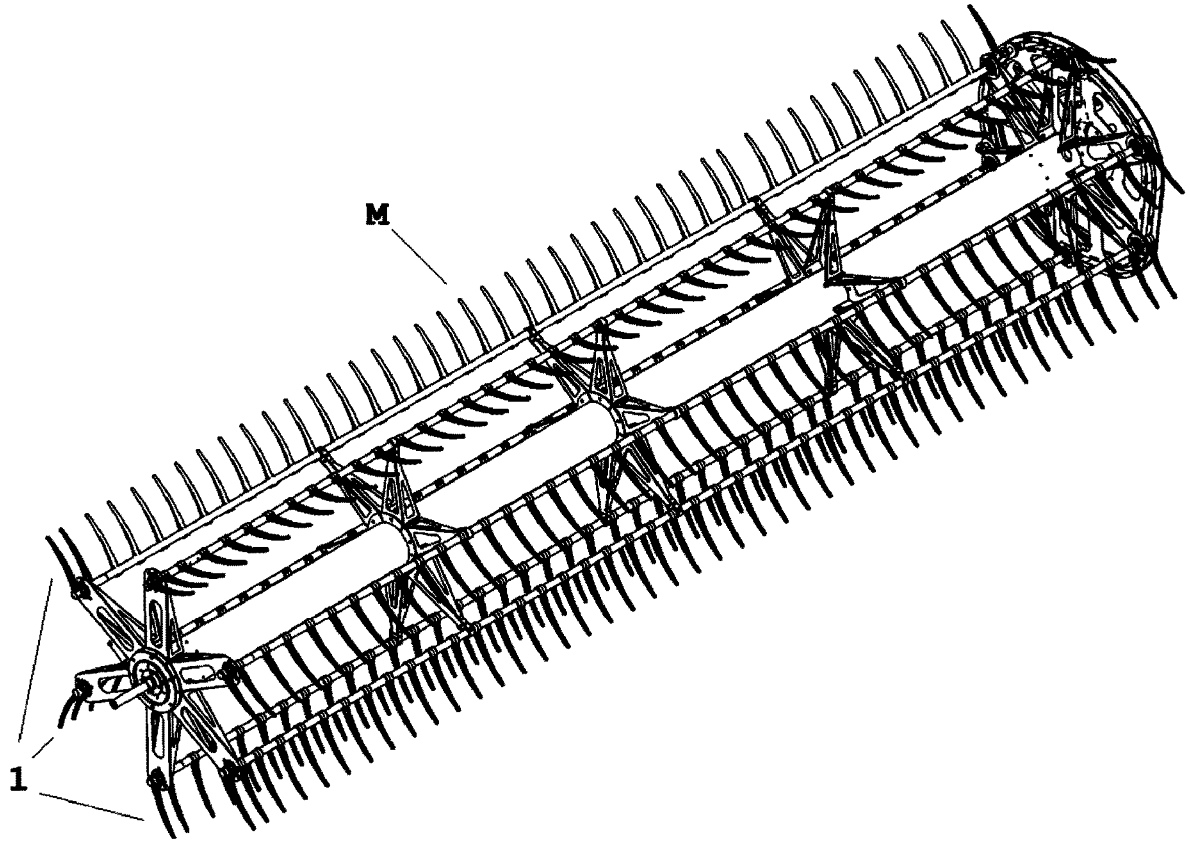
FIG. 1 shows a perspective view of the reel.
Figure 2:
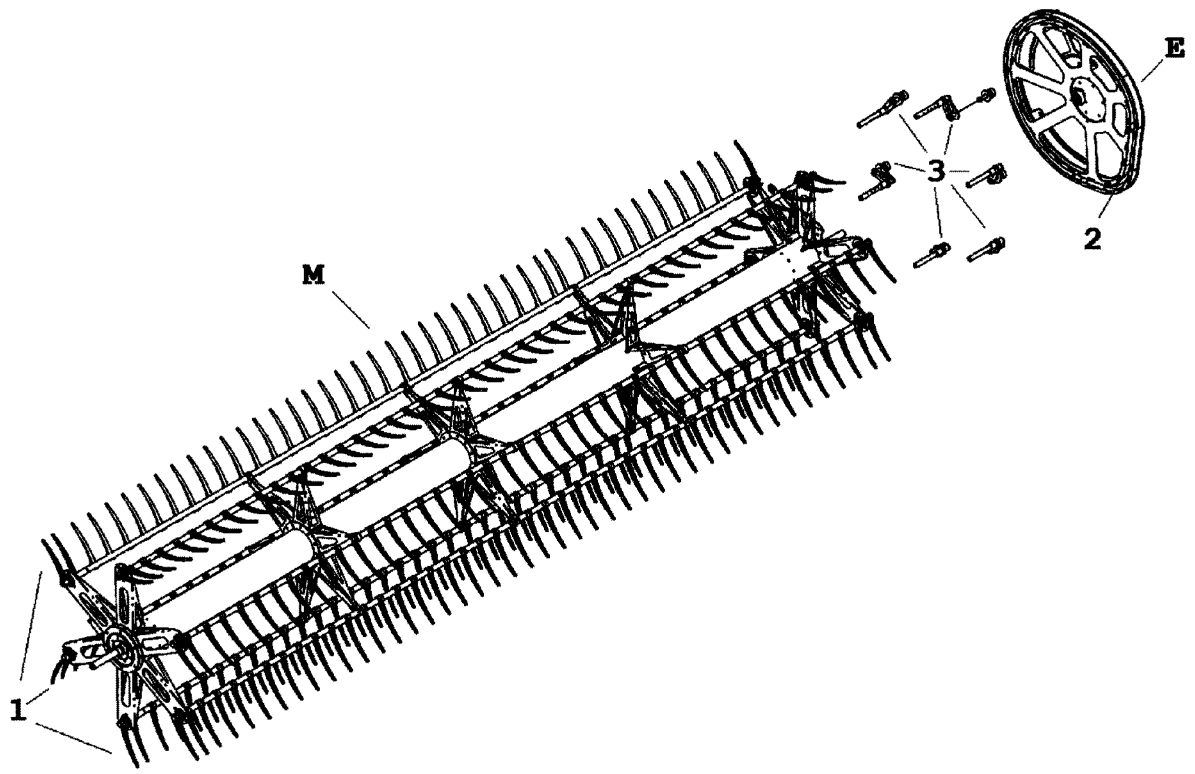
FIG. 2 shows an exploded perspective view of the reel, showing finger support cams.
Figure 3:
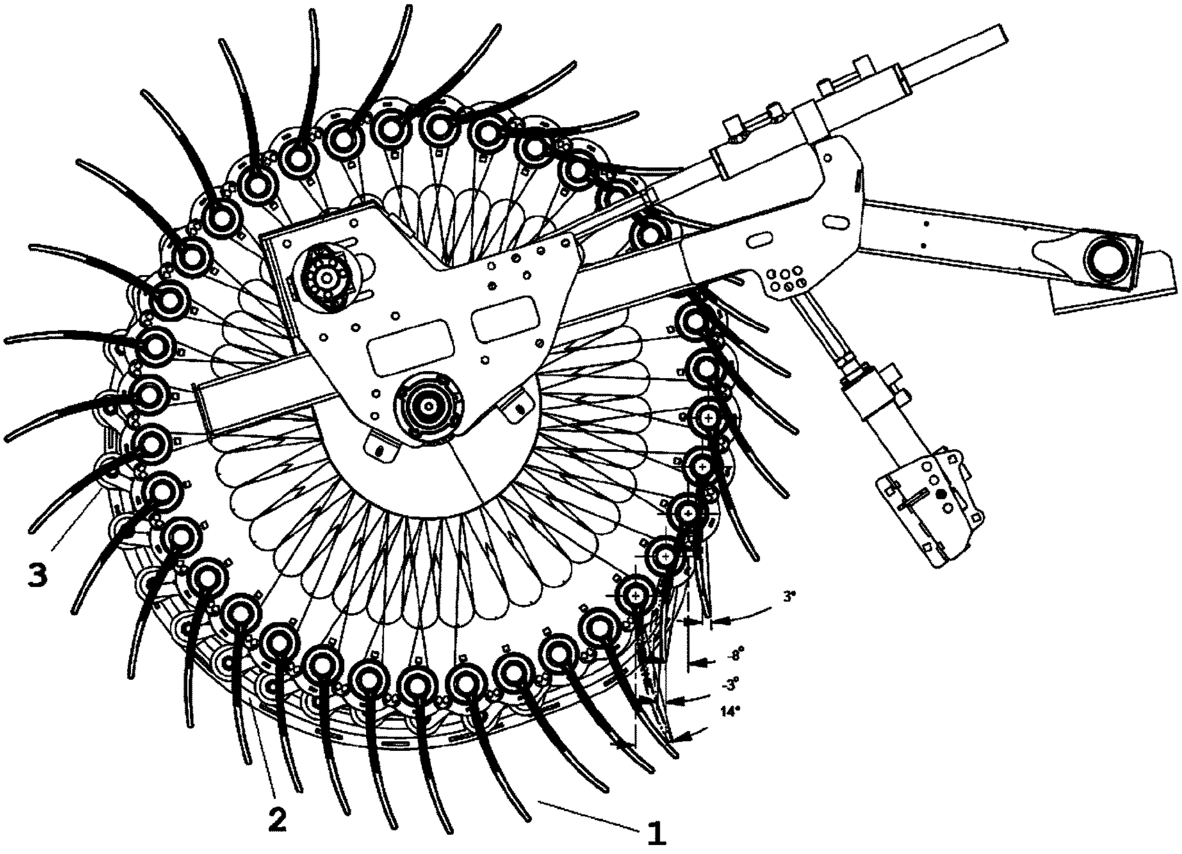
FIG. 3 shows a detailed view of the finger angle regulation before, during and after the cut raw plants are unloaded.
Figure 4:
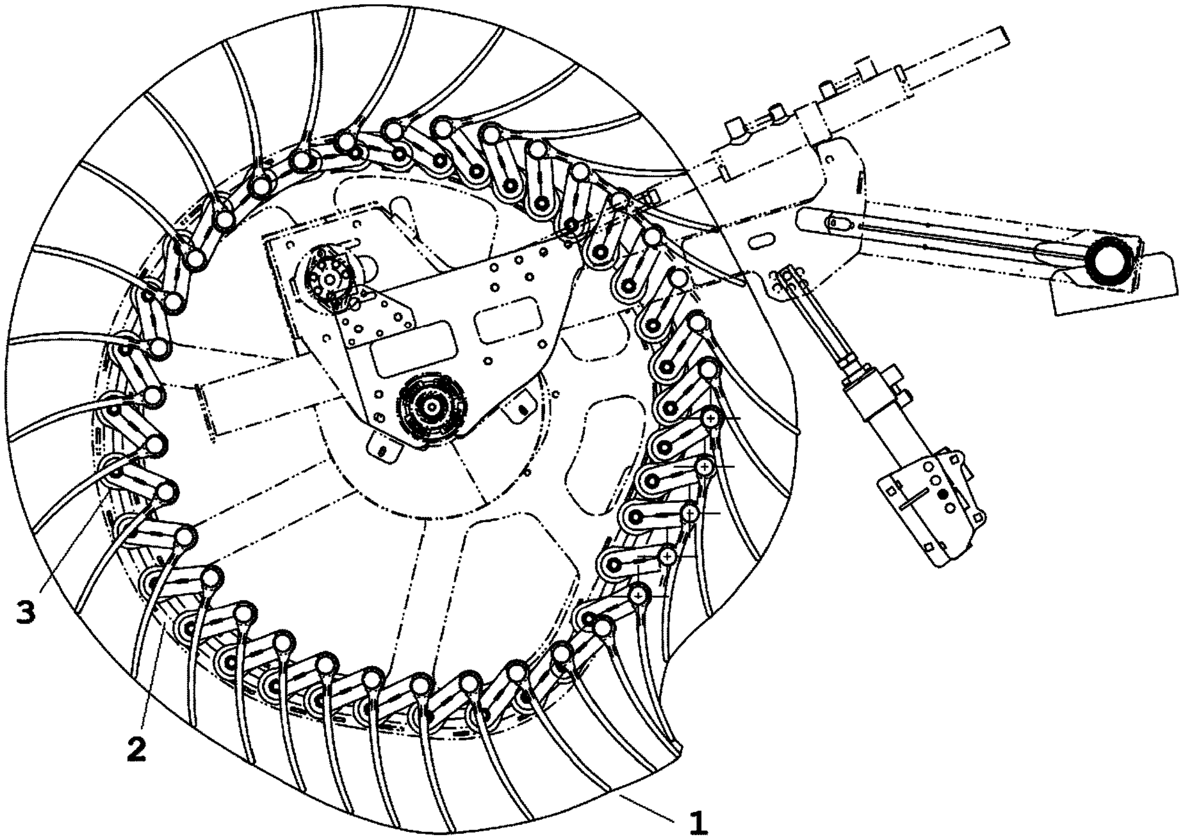
FIG. 4 shows a detailed view of the cam and finger path before, during and after the cut raw plants are unloaded.
Figure 5:
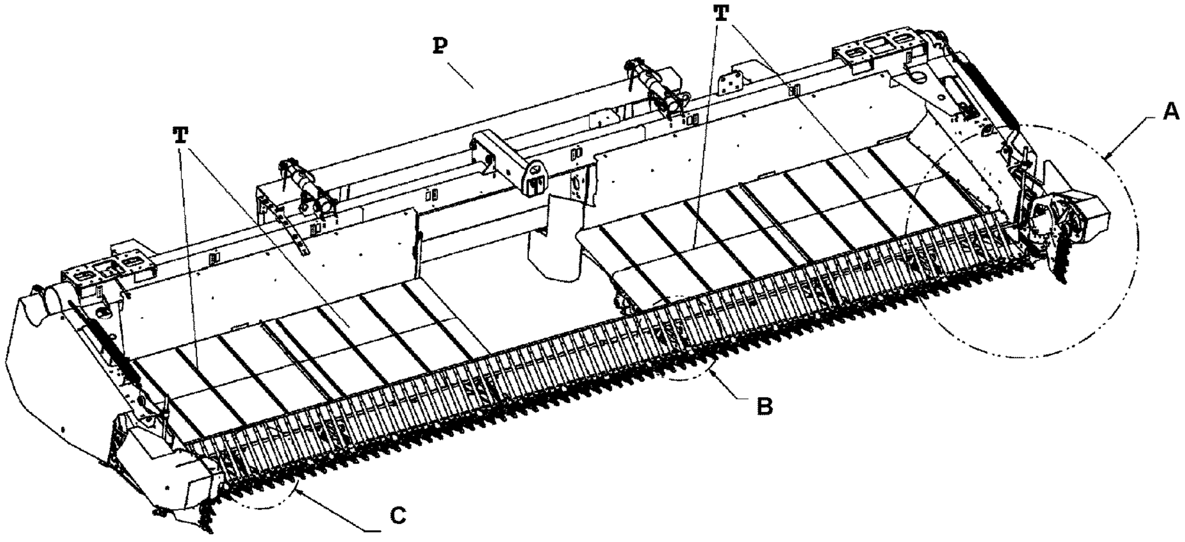
FIG. 5 shows an upper front perspective view of the platform.

As shown by FIGS. 1 to 5, the present constructive arrangement applied to a harvesting machine includes a cam system, which path regulates the attack angle of the reel fingers (1), when the raw plant is lifted from the soil, to facilitate cutting, changing the angle when the cut raw plant is unloaded over the conveyor belts (T) of the platform (P), so to avoid its adherence and return by the reel (M) and, for that, the cam path (2) of the cams (3), as included in the bearing structure (E) of the reel, changes the finger angle at the starting point of unloading the cut raw plant, which, immediately before, was of at least 14°, to at least −3°, then to at least −8° and then to at least 3° at the final unloading point.

Figure 6:
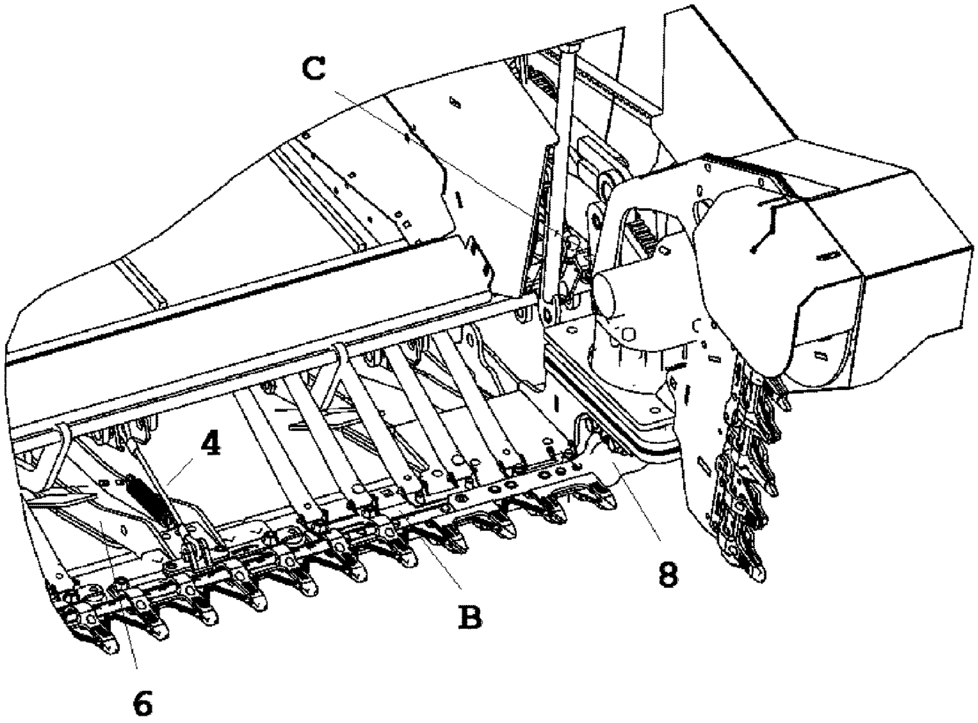
FIG. 6 shows a magnified view of detail A of FIG. 5, highlighting the top tether.
Figure 7:
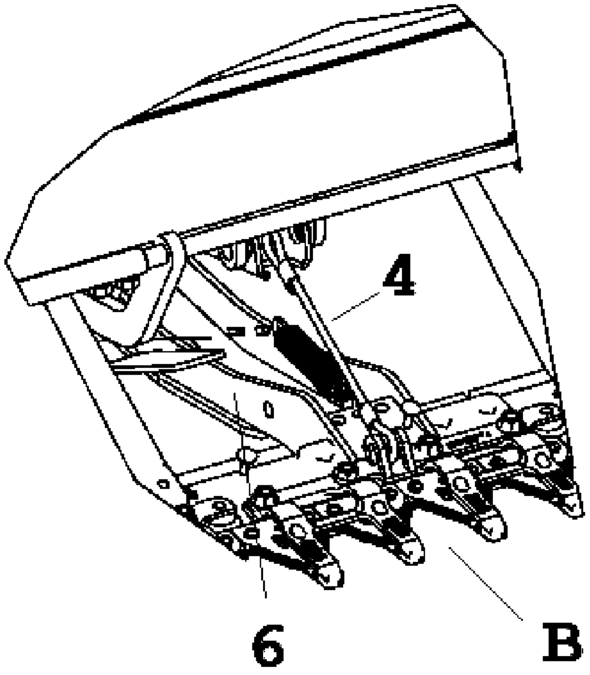
FIG. 7 shows a magnified view of detail B of FIG. 5, highlighting the top tether.
Figure 8:
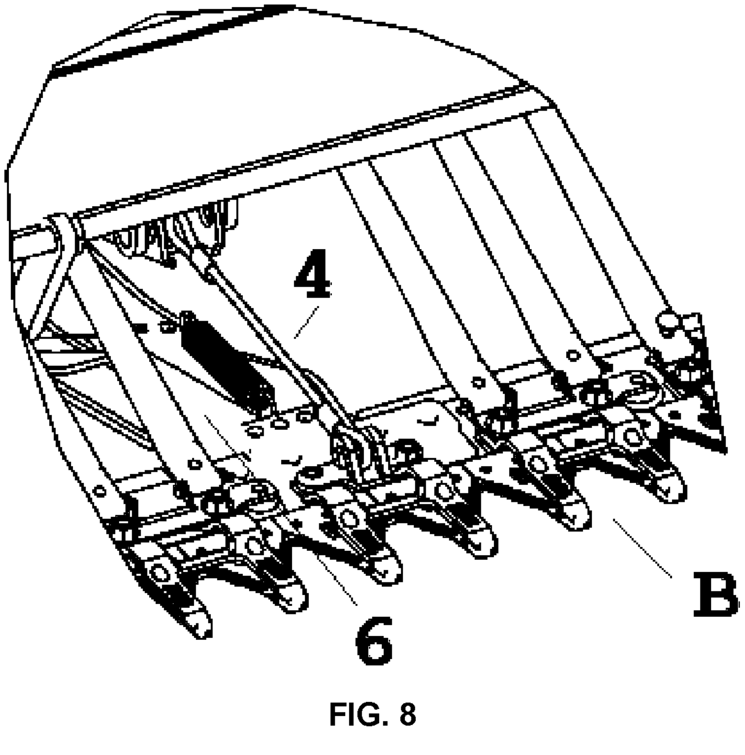
FIG. 8 shows a magnified view of detail C of FIG. 5, highlighting the top tether.
Figure 9:
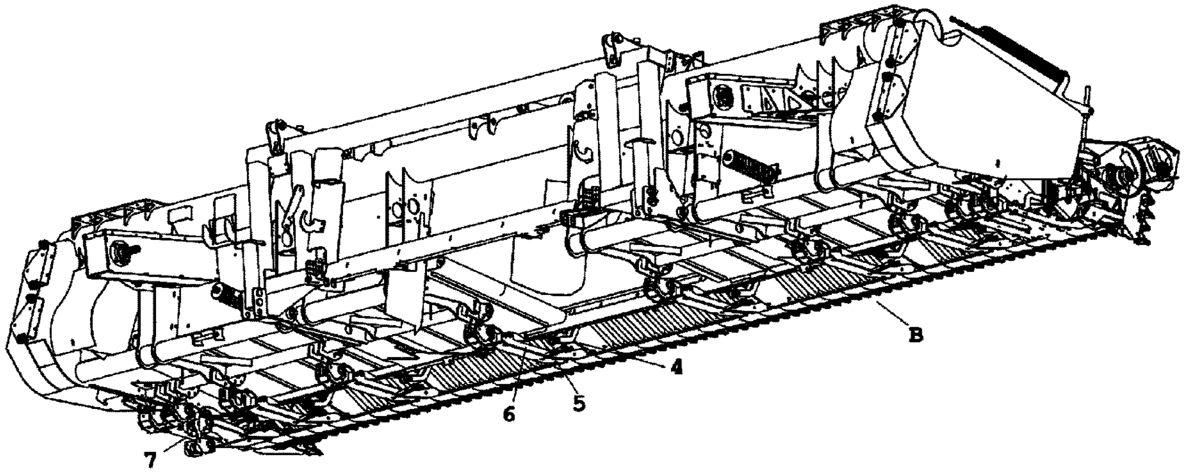
FIG. 9 shows a lower rear perspective view of the platform.
Figure 10:
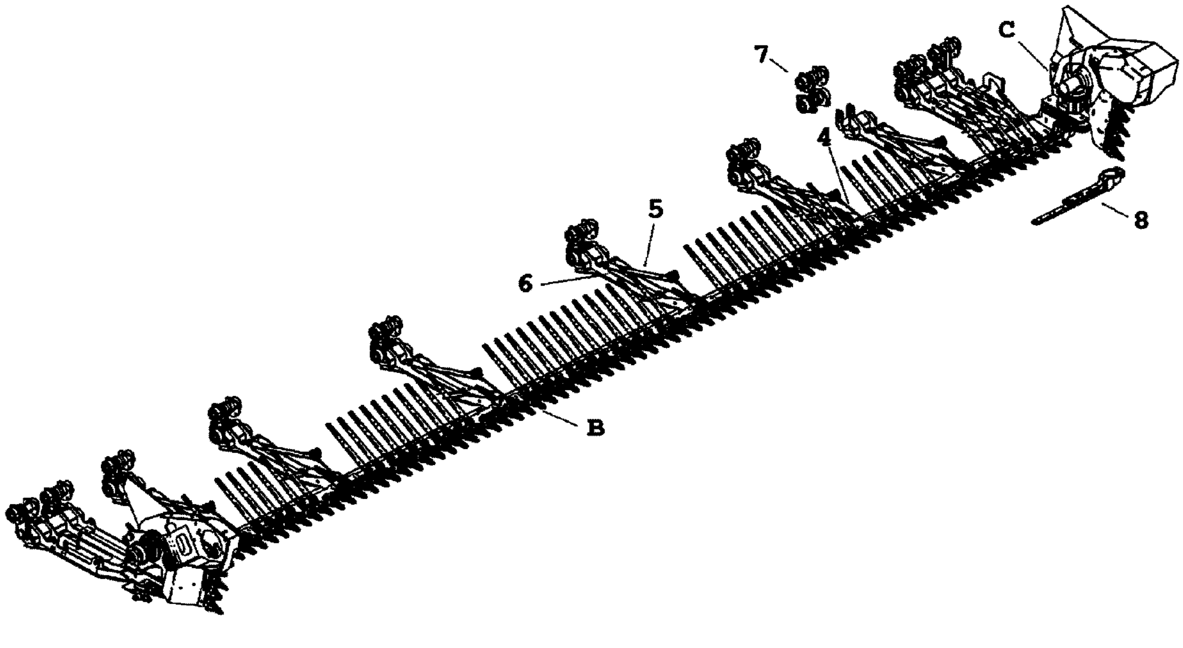
FIG. 10 shows an upper perspective view of the cutting system, showing in exploded details the “counterfoil” below the base of the gearbox, and the rear set of rollers for the crossbeams of the cutting bar.

As shown by FIGS. 5 to 10, the present constructive arrangement applied to a harvesting machine as disclosed herewith also includes the development of an attachment of a top tether (4), which may be formed by a steel cable, belt or chain, on the upper shafts (5) of the crossbeams (6) of the cutting bar (B), which, jointly with the roller sets (7) as attached to the rear part of said crossbeams, sustain the flexibility of the cutting bar, so that, when the bar enters a soil depression, said top tether does not allow it to be forced backwards, thus avoiding breaking or torsion and providing better flexibility to the cutting bar, besides widening its freedom of movement, against soil irregularities.

Figure 11:
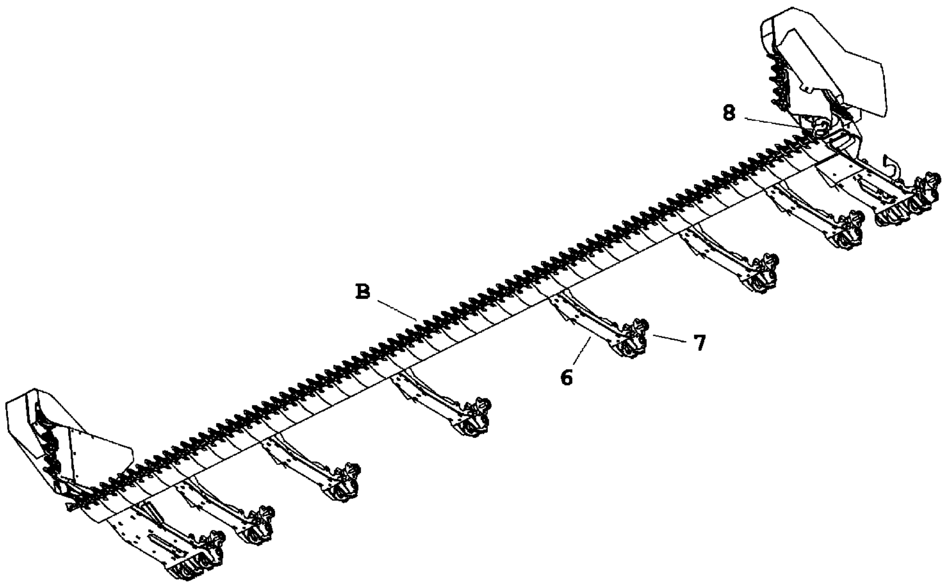
FIG. 11 shows a lower perspective view of the cutting system, showing in detail the “counterfoil” below the base of the gearbox.
Figure 12:
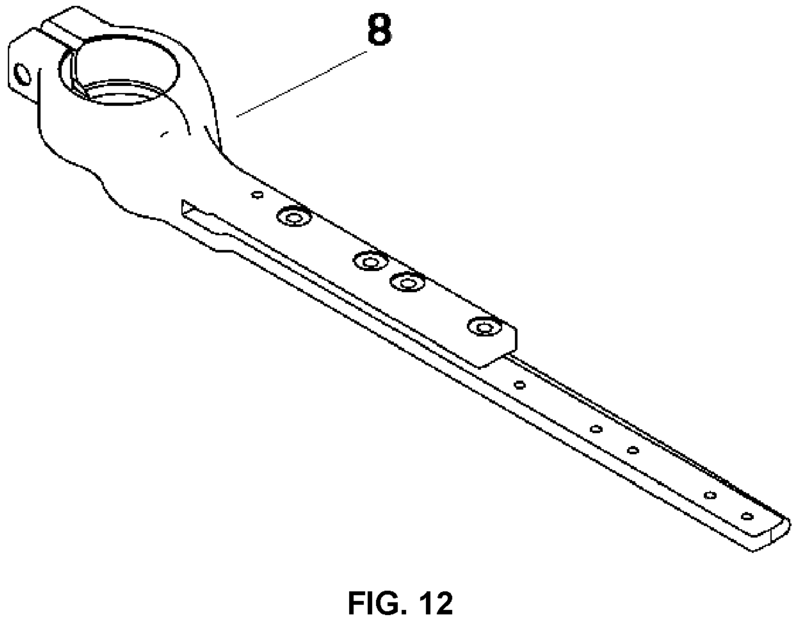
FIG. 12 shows a perspective view of the “counterfoil”.
Figure 13:
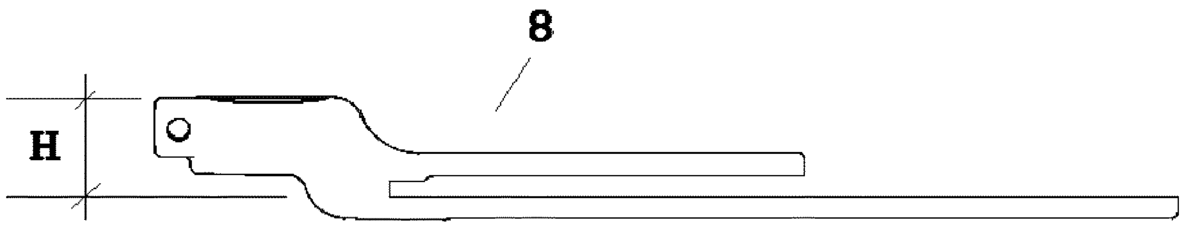
FIG. 13 shows a side view of the “counterfoil”.

As shown by FIGS. 10 to 13, the present constructive arrangement applied to a harvesting machine as disclosed herein also includes a change in the "counterfoil" (8) profile, increasing the height (H) of the base of the gearbox (C) in at least 25 mm over said cutting bar, which height remains unchanged, so to provide for a better and lower cut, avoiding the raw plants from being smashed.

The invention claimed is:

1. A constructive arrangement applied to harvesting machines, comprising:

(a) a reel;

(b) a plurality of reel fingers extending from the reel;

(c) a bearing structure attached to the reel;

(d) a cam system attached to the bearing structure that regulates attack angle of the reel fingers, the cam system comprising a plurality of cams and a cam path, the plurality of cams travelling along the cam path; and (e) a cutting bar comprising crossbeams with roller sets attached to a rear part of the crossbeams;

wherein the roller sets comprise a plurality of rollers, the plurality of rollers being interconnected by a cable;

wherein the cam system facilitates cutting of raw plant when the raw plant is lifted from soil;

wherein when the cut raw plant is unloaded over conveyor belts of a platform, the plurality of cams of the cam system changes the attack angle of the reel fingers at the starting point of unloading the cut raw plant, from 14° immediately before the unloading of the cut raw plant over the conveyor belts of the platform to at least −3°, then to at least −8° and then to at least 3° at a final unloading point; and wherein the attack angle is measured with respect to a vertical plane.

2. The constructive arrangement of claim 1, further comprising:

a top tether;

wherein the roller sets and attachment of the top tether to upper shafts of the crossbeams sustain the flexibility of the cutting bar and widen a freedom of movement.

3. The constructive arrangement of claim 2, wherein the top tether is formed by a steel cable.

4. The constructive arrangement of claim 2, wherein the top tether is formed by a belt.

5. The constructive arrangement of claim 2, wherein the top tether is formed by a chain.

6. The constructive arrangement of claim 2, further comprising a counterfoil with an altered profile, situated below a gear box, and the counterfoil increasing a height of the base of the gearbox in at least 25 mm over the cutting bar, without changing the height of the cutting bar.

7. A constructive arrangement applied to harvesting machines, comprising:

(a) a reel;

(b) a plurality of reel fingers extending from the reel;

(c) a bearing structure attached to the reel;

(d) a cam system attached to the bearing structure that regulates attack angle of the reel fingers, the cam system comprising a plurality of cams and a cam path, the plurality of cams travelling along the cam path; and (e) a cutting bar comprising crossbeams with roller sets attached to a rear part of the crossbeams;

wherein the roller sets comprise a plurality of rollers, the distance between the plurality of rollers being adjustable;

wherein the cam system facilitates cutting of raw plant when the raw plant is lifted from soil;

wherein when the cut raw plant is unloaded over conveyor belts of a platform, the plurality of cams of the cam system changes the attack angle of the reel fingers at the starting point of unloading the cut raw plant, from 14° immediately before the unloading of the cut raw plant over the conveyor belts of the platform to at least −3°, then to at least −8° and then to at least 3° at a final unloading point; and wherein the attack angle is measured with respect to a vertical plane.

8. A constructive arrangement applied to harvesting machines, comprising:

(a) a reel;

(b) a plurality of reel fingers extending from the reel;

(c) a bearing structure attached to the reel;

(d) a cam system attached to the bearing structure that regulates attack angle of the reel fingers, the cam system comprising a plurality of cams and a cam path, the plurality of cams travelling along the cam path; and (e) a cutting bar comprising crossbeams with roller sets attached to a rear part of the crossbeams;

wherein the roller sets comprise a plurality of rollers, the plurality of rollers being interconnected by a cable, and the distance between the plurality of rollers is adjustable;

wherein the cam system facilitates cutting of raw plant when the raw plant is lifted from soil;

wherein when the cut raw plant is unloaded over conveyor belts of a platform, the plurality of cams of the cam system changes the attack angle of the reel fingers at the starting point of unloading the cut raw plant, from 14° immediately before the unloading of the cut raw plant over the conveyor belts of the platform to at least −3°, then to at least −8° and then to at least 3° at a final unloading point; and wherein the attack angle is measured with respect to a vertical plane.

* * * * *